US008748830B2

(12) United States Patent
Kusner

(10) Patent No.: US 8,748,830 B2
(45) Date of Patent: Jun. 10, 2014

(54) RADIATION SENSOR TO DETECT DIFFERENT TARGETED RADIATION AND RADIATION DETECTION SYSTEM INCLUDING THE RADIATION SENSOR

(75) Inventor: Michael R. Kusner, Auburn Township, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 117 days.

(21) Appl. No.: 13/151,184

(22) Filed: Jun. 1, 2011

(65) Prior Publication Data

US 2011/0291014 A1 Dec. 1, 2011

Related U.S. Application Data

(60) Provisional application No. 61/350,219, filed on Jun. 1, 2010.

(51) Int. Cl.
*G01T 1/20* (2006.01)

(52) U.S. Cl.
USPC .......................................... 250/367

(58) Field of Classification Search
USPC .......................................... 250/367
See application file for complete search history.

(56) References Cited

U.S. PATENT DOCUMENTS

| | | | | |
|---|---|---|---|---|
| 2,961,541 | A * | 11/1960 | Ruderman | 250/362 |
| 5,038,042 | A * | 8/1991 | Hansen et al. | 250/368 |
| 5,317,158 | A | 5/1994 | McElhaney et al. | |
| 6,313,465 | B1 | 11/2001 | Nittoh et al. | |
| 7,151,447 | B1 | 12/2006 | Willms et al. | |
| 7,372,040 | B2 | 5/2008 | Polichar et al. | |
| 7,525,101 | B2 * | 4/2009 | Grodzins | 250/390.11 |
| 2007/0029493 | A1 * | 2/2007 | Kniss et al. | 250/370.11 |
| 2007/0069146 | A1 * | 3/2007 | Neal et al. | 250/390.11 |
| 2009/0121141 | A1 * | 5/2009 | Eriksson et al. | 250/363.04 |
| 2009/0200480 | A1 | 8/2009 | Clothier et al. | |
| 2011/0204243 | A1 * | 8/2011 | Bendahan et al. | 250/367 |

FOREIGN PATENT DOCUMENTS

| | | |
|---|---|---|
| JP | 11-271453 A | 10/1999 |
| WO | 2009150416 A2 | 12/2009 |

OTHER PUBLICATIONS

Browne, M.C. et al. "Prototype Neutron-Capture Counter for Fast-Coincidence Assay of Plutonium in Residues," retrieved from <http://esarda2.jrc.it/db_proceeding/mfile/P_2001_Bruges_17-1.pdf>, printed Dec. 13, 2011, pp. 481-486.
The International Search Report and the Written Opinion for International Application No. PCT/US2011/038816 received from the International Searching Authority (ISA/KR), dated Feb. 9, 2012, 8 pages.

* cited by examiner

*Primary Examiner* — Christine Sung
(74) *Attorney, Agent, or Firm* — Adel Law Group, LLP; Robert N. Young

(57) ABSTRACT

A radiation sensor can include a first layer and a second layer. The first layer can include a first scintillation material to produce first light in response to receiving a first targeted radiation, and the second layer can include a second scintillation material to produce second light in response to receiving a second targeted radiation. The first scintillation material can be different from the second scintillation material, and the first targeted radiation can be different from the second targeted radiation. The first layer can be configured to receive and transmit the second light. In an embodiment, the radiation sensor can be part of a radiation detection system that includes a photosensor that can produce an electronic pulse in response to the first and second lights. A method of detecting radiation can include using the radiation detection system to distinguish different radiations by differences in pulse shape.

20 Claims, 5 Drawing Sheets

RADIATION SENSOR TO DETECT DIFFERENT TARGETED RADIATION AND RADIATION DETECTION SYSTEM INCLUDING THE RADIATION SENSOR

CROSS-REFERENCE TO RELATED APPLICATION

This application claims priority under 35 U.S.C. §119(e) to U.S. Patent Application No. 61/350,219 entitled "Radiation Sensor to Detect Different Targeted Radiation and Radiation Detection System Including The Radiation Sensor," by Kusner, filed Jun. 1, 2010, which is assigned to the current assignee hereof and incorporated herein by reference in its entirety.

FIELD OF THE DISCLOSURE

The present disclosure relates to radiation sensors, and more particularly, radiation sensors configured to detect different targeted radiation, and radiation detection systems including such radiation sensors.

BACKGROUND

Radiation detection systems are used in a variety of applications. For example, scintillators can be used for medical imaging and for well logging in the oil and gas industry. A scintillation member can be effective for detecting gamma rays or neutron radiation. Generally, the scintillation member is enclosed in a casing or sleeve that includes a window to permit radiation-induced scintillation light to pass out of the package. The light is detected by a photosensor, such as a photomultiplier tube. The photomultiplier tube can convert the photons emitted from the scintillation member into electrical pulses. The electrical pulses are can be processed by associated electronics and may be registered as counts that are transmitted to analyzing equipment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one of the item may be used in place of a single item. Similarly, where more than one of the item is described herein, a single item may be substituted.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the scintillating and radiation detection arts.

Figure 1:
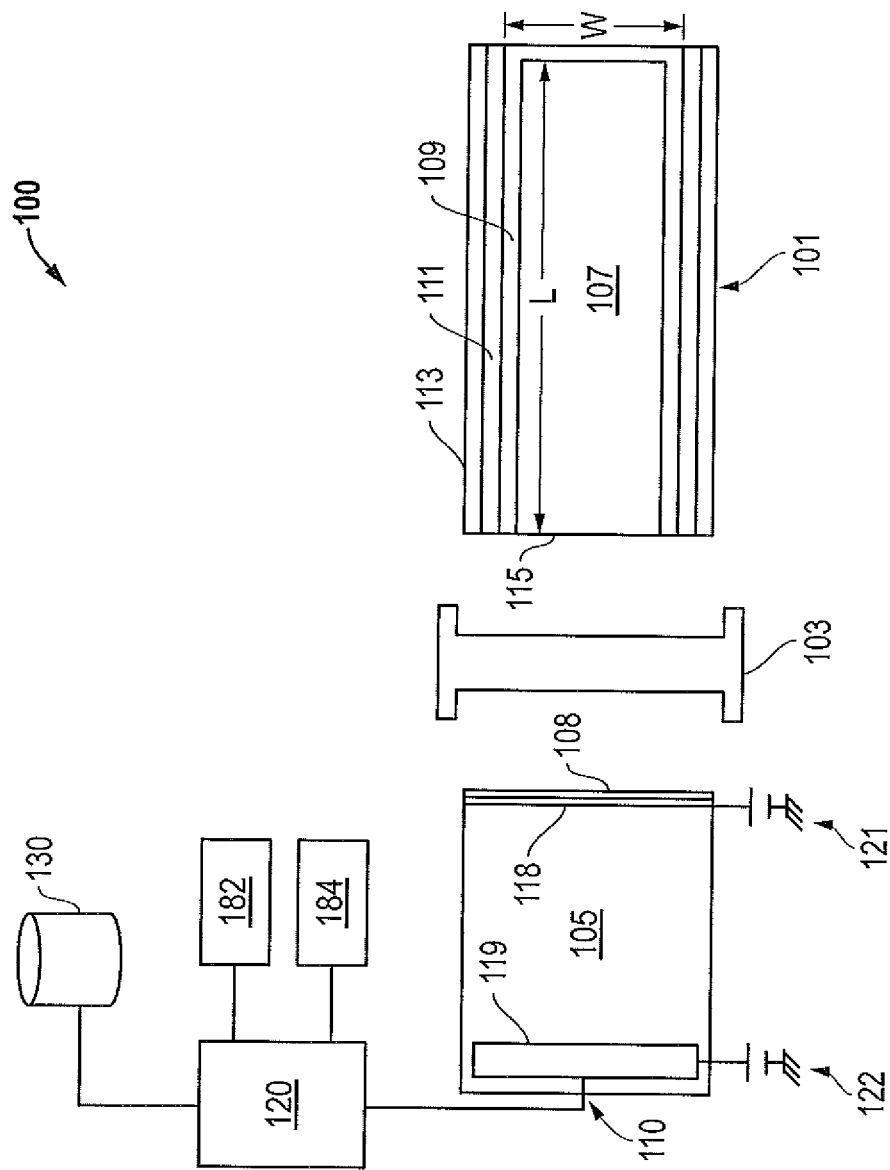
FIG. 1 includes a schematic diagram illustrating a radiation detection system.

FIG. 1 illustrates a particular embodiment of a radiation detection system 100. The radiation detection system 100 can include a radiation sensor 101 coupled to a photosensor 105. In an embodiment, the radiation detection system 100 includes a light pipe 103. Though the radiation sensor 101, the light pipe 103, and the photosensor 105 are illustrated separate from each other, the radiation sensor 101 and the photosensor 105 can be coupled to each other directly or via the light pipe 103. In an embodiment, the radiation sensor 101 and the photosensor 105 can be coupled to the light pipe 103 using an optical gel, bonding agent, fitted structural components, or any combination thereof.

The radiation sensor 101 can include a scintillation member 107 housed within a casing 113. The scintillation member 107 can detect neutron radiation (for example, thermal neutrons and fast neutrons), gamma radiation, other targeted radiation, or any combination thereof. In an embodiment, the scintillation member 107 can include a plurality of different scintillation materials. Details regarding the composition of the scintillation member 107 are described in more detail later in this specification. In an embodiment, the scintillation member 107 has a length, L, and a width, W, as illustrated in FIG. 1. In a particular embodiment, the scintillation member 107 has a length of at least approximately 0.5 meters. For example, the scintillation member 107 has a length of at least approximately 0.7 meters or at least approximately 1.1 meters. In another example, the scintillation material extends greater than 2 meters, such as greater than 3 meters, or another length corresponding to a height of a person, a vehicle, such as an automobile, a truck, a watercraft, a rail car, an aircraft, other suitable cargo vehicle, or any combination thereof. In another embodiment, the scintillation member 107 can have a width, W, substantially perpendicular to the length, L, where the width is at least approximately 0.01 meters and at most equal to the length L. For example, the scintillation member 107 can be a polygon having a width of at least approximately 0.01 meters. In another example, the scintillation member 107 can be substantially cylindrical and can have a diameter, a particular type of width, of at least approximately 0.1 meters.

In a particular embodiment, the radiation sensor 101 can be surrounded by a neutron moderator (not illustrated in FIG. 1), such as polyethylene or another material, to convert fast neutrons into thermal neutrons, when the particular targeted radiation to be detected includes fast neutrons. The radiation sensor 101 can also include a reflector 109. In one embodiment, the casing 113 can include a material that is substantially non-reactive with the scintillation member 107, environmental conditions, or any combination thereof. For example, the casing material can include stainless steel, plastic, another suitable material, or any combination thereof. A shock-absorbing member 111 may be disposed between the casing 113 and the reflector 109. Further, the casing 113 can include an output window 115 that is interfaced to an end of the scintillation member 107. The output window 115 can include glass or another transparent or translucent material suitable to allow photons emitted by the radiation sensor 101 to pass toward the photosensor 105. An optical interface, such as silicone rubber, can be disposed between the scintillation member 107 and the output window 115. The optical interface can be polarized to align the reflective indices of the scintillation member 107 and the output window 115.

As illustrated, the light pipe 103 is disposed between the photosensor 105 and the radiation sensor 101 and facilitates optical coupling between the photosensor 105 and the radiation sensor 101. In an embodiment, the light pipe 103 includes a quartz light pipe, plastic light pipe, or another light pipe. In another embodiment, the light pipe 103 can include a silicone rubber interface that optically couples an output window 115 of the radiation sensor 101 with the input window 108 of the photosensor 105. In a further embodiment, a plurality of light pipes is disposed between the photosensor 105 and the radiation sensor 101.

The photosensor 105 can include a photodiode, a photomultiplier tube ("PMT"), a silicon photomultiplier ("SiPM"), an avalanche photodiode ("APD"), or a hybrid PMT that includes a photocathode and an electron sensor. The photosensor 105 can be housed within a tube or housing made of a material capable of protecting electronics associated with the photosensor 105, such as a metal, metal alloy, another material, or any combination thereof.

The photosensor 105 can include an input window 108, such as a window that can include any of the materials described with respect to the output window 115. The input window 108 and the output window 115 can have substantially the same composition or can have different compositions. In a particular, illustrative embodiment, the photosensor 105 receives light from the radiation sensor 101 via the input window 108. The output window 115 or the input window 108 may have a discrete filter material incorporated therein. In another embodiment, a filter may be another location between the scintillation member 107 and a photocathode 118 of the photosensor 105. In a particular embodiment, the filter material or discrete filter can be used to allow some light, but not all light to pass. For example, a blue filter material or blue filter may allow blue light to pass, but block another spectrum light, for example, red light.

In a particular embodiment, the photosensor 105 can receive light emitted by the radiation sensor 101 as a result of the scintillation member 107 receiving gamma radiation, neutron radiation, other particular radiation, or any combination thereof. The emitted light photons can strike the photocathode 118 of the photosensor 105 and transfer energy to electrons of the photocathode 118. Thus, some electrons are emitted as free electrons from a surface of the photocathode 118 that is opposite the input window 108. In a particular embodiment, the surface of the photocathode 118 can include a layer of electropositive material that can facilitate emission of the electrons from the surface of the photocathode 118.

Electrons emitted by the photocathode 118 are collected at an anode of the photosensor 105, and signals, in the form of one or more electronic pulses, are sent to the processing module 120 via the output 110. In an example, a voltage 121, such as a supply voltage or another voltage, is applied to the photocathode 118. Electrons emitted from the surface of the photocathode 118 can be accelerated, by the voltage 121 and strike the surface of an electron sensor 119. In addition, a voltage 122, such as a reverse bias voltage or another voltage, can be applied to the electron sensor 119. Energy from electrons entering the electron sensor can produce charge carriers that are removed from the electron sensor 119 by the reverse bias voltage 122, thus creating an electrical pulse. The processing module 120 can include a pulse analyzer that can analyze the electronic pulse from the photosensor 105 and identify the type of radiation to which the electronic pulse corresponds.

The photosensor 105 can be coupled to a processing module 120 that includes a pulse analyzer in a particular embodiment. As illustrated in the embodiment of FIG. 1, an electronic pulse or another signal is sent from the photosensor 105 to the pulse analyzer, via an output 110, which can be in the form of a coaxial cable or other electronic transmission medium to transmit electrical signals from the photosensor 105 to the pulse analyzer. The pulse analyzer can be configured to analyze pulses received from the photosensor 105 to determine the type of radiation to which the pulse corresponds. The pulse analyzer can be coupled to radiation counters 182 and 184, via the processing module 120, which sends a signal to the radiation counter 182 when one type of radiation is detected, and sends a signal to the radiation counter 184 when another type of radiation is detected. In a particular embodiment, the radiation counter 182 is a neutron counter, and the radiation counter 184 is a gamma radiation counter. In another embodiment, one or both of the radiation counters may be replaced by another counter for a different targeted radiation (for example, x-ray, beta particles, etc.).

The processing module 120 can include hardware, firmware, or any combination thereof that is configured to perform operations as described later in this specification. Examples of such hardware and firmware include circuits within one or more integrated circuits, one-time programmable devices, field programmable gate arrays, application-specific integrated circuits, and the like. After reading this specification, skilled artisans will appreciate that other components can be used. In another embodiment, the processing module 120 can include a central processing unit, a graphics processing unit, another suitable processing unit, or any combination thereof. In still another embodiment, the processing module 120 can be coupled to a storage device 130, which can be a tangible processor-readable medium. The storage device 130 can include a hard disk, a read-only memory, random-access memory, a memory drive within a storage network, or the like. The storage device 130 can include code. The processing module 120 can retrieve code from the storage device 130, wherein the code includes instructions to carry out the operations. The processing module 120, the storage device 130, or both may be coupled to other equipment within the radiation detection system 100 or may be coupled to networking equipment (not illustrated).

Figure 2:
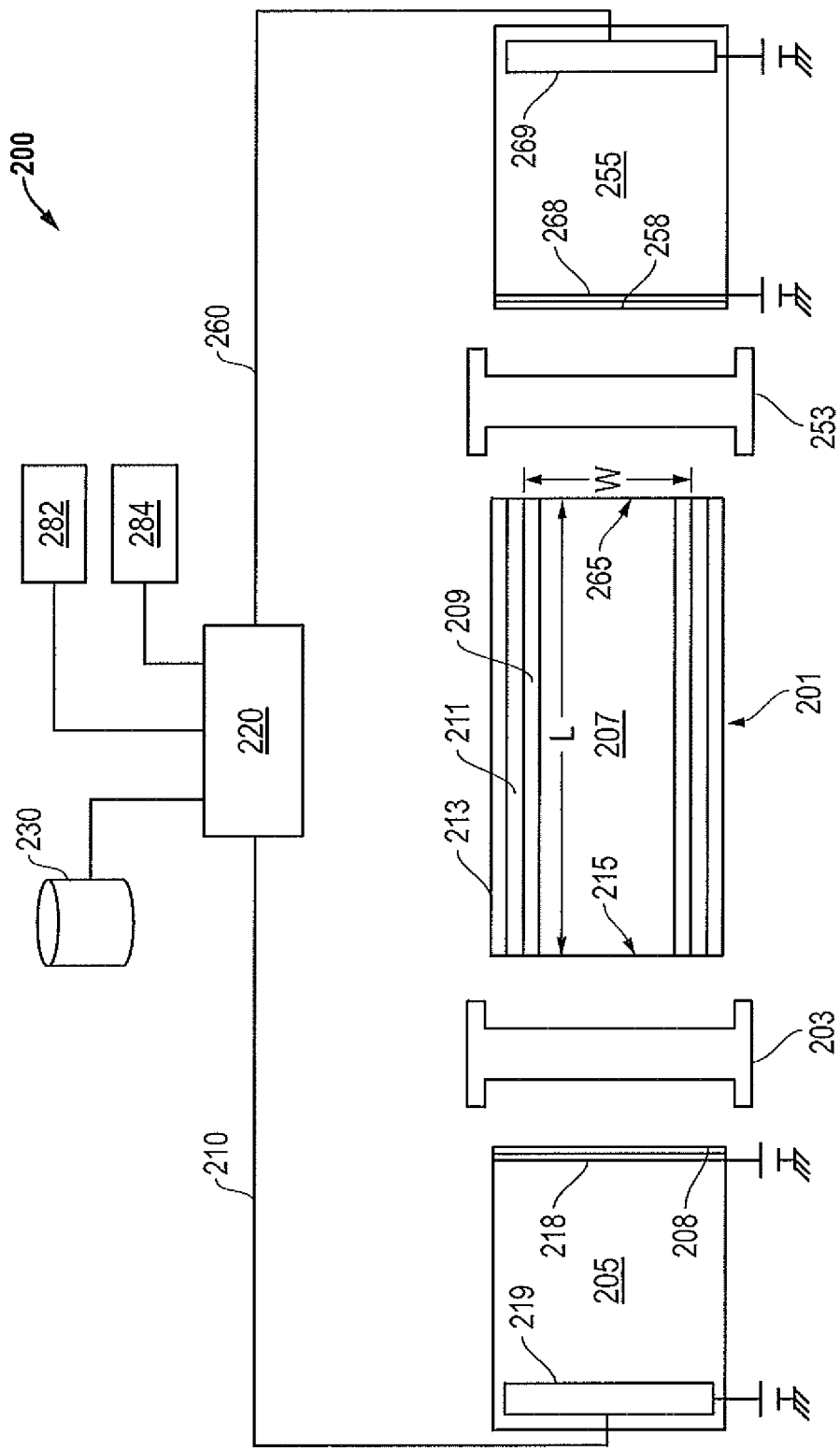
FIG. 2 includes a schematic diagram illustrating another radiation detection system.

FIG. 2 illustrates another embodiment of a radiation detection system 200 that similar to the radiation detection system 100 except that the radiation detection system 200 includes two photosensors 205 and 255 coupled to a radiation sensor 201. Many of the functions, compositions, and configurations of components within the radiation detection system 200 will be described with respect to corresponding components of the radiation detection system 100.

With respect to the radiation sensor 201, its configuration may or may not be modified to allow it to be coupled to the photosensors 205 and 255. The scintillation member 207 can perform any of the functions of the scintillation member 107. The radiation sensor 201 can be surrounded by a neutron moderator (not illustrated in FIG. 2) that performs any of the functions or include any of the materials described with respect to the neutron moderator described with respect to the radiation sensor 101. A reflector 209, a shock-absorbing member 211, and the casing 213 can perform any of the functions of and include any of the materials previously described with respect to the reflector 109, the shock-absorbing member 111, and the casing 113, respectively. The configuration of the reflector 209, a shock-absorbing member 211, and the casing 213 may be modified to allow the photosensors 205 and 255 to be coupled to the radiation sensor 201. Output windows 215 and 265 can perform any of the functions of and include any of the materials used within the output window 115. Light pipes 203 and 253 can perform any of the functions of and include any of the materials used within the light pipe 103. The output window 215 may have the same or different configuration or materials as compared to the output window 265, and the light pipe 203 may have the same or different configuration or materials as compared to the light pipe 253.

The photosensors 205 and 255 can perform any of the functions and include any of the components as described with respect to the photosensor 105. The photosensors 205 and 255 can be of the same type or different types as compared to each other. Selection of photosensors 205 and 255 is addressed later in this specification. Input windows 208 and 258 can perform any of the functions of and include any of the materials used with the input window 108. The output window 215 or 265, the input window 208 or 258, or any combination of such window may have a filter material incorporated therein. In another embodiment, one or more discrete filters may be at a location between the scintillation member 207 and the photocathode 218 of the photosensor 205 and between the scintillation member 207 and the photocathode 268 of the photosensor 255. In a particular embodiment, the radiation detection system 200 can include different filtering materials or discrete filters, such that the photosensor 205 receives blue light and substantially no or a significantly reduced amount of green light, and the photosensor 255 receives green light and substantially no or a significantly reduced amount of blue light. Clearly, other filter combinations may be used if needed or desired. Photocathodes 218 and 268 can perform any of the functions of and include any of the materials used within the photocathode 118. Electron sensors 219 and 269 can perform any of the functions of and include any of the materials used within the electron sensor 119.

An output 210 is coupled to the electron sensor 219 and a processing module 220, and an output 260 is coupled to the electron sensor 269 and the processing module 220. The outputs 210 and 260 can perform any of the functions and any include any of the materials used within the output 110. The processing module 220, a storage device 230, a radiation counter 282, and a radiation counter 284 can perform any of the functions of and be configured as described with respect to the processing module 120, the storage device 130, the radiation counter 182, and the radiation counter 184, respectively.

Figure 3:
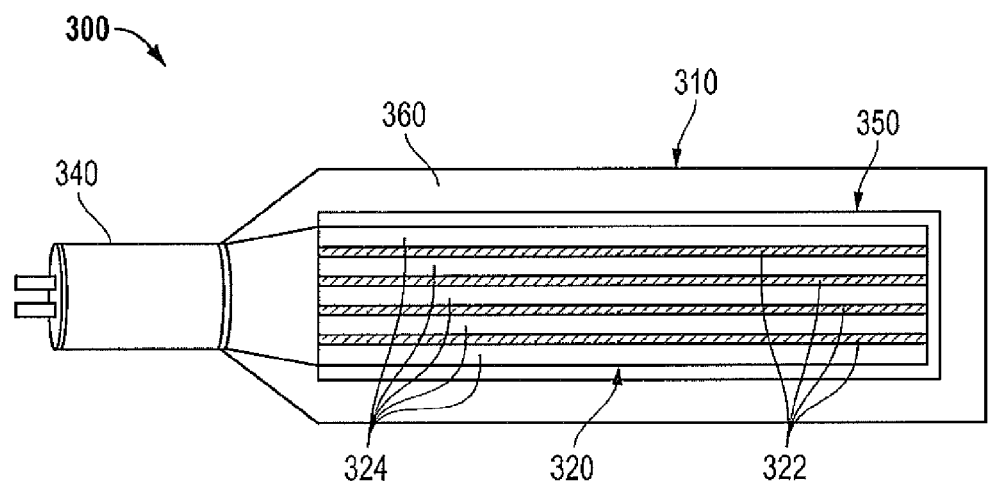
FIG. 3 includes an illustration of a cross-sectional view of an apparatus that includes a radiation sensor and a photosensor that can be used with the radiation detection system of FIG. 1.
Figure 4:
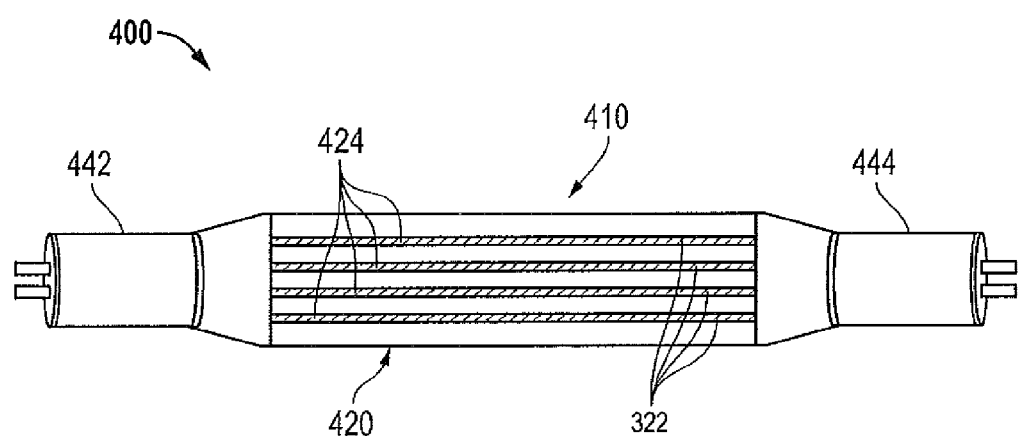
FIG. 4 includes an illustration of a cross-sectional view of an apparatus that includes a radiation sensor and photosensors that can be used with the radiation detection system of FIG. 2.

The scintillation members 107 and 207 can include a composite of at least two different scintillation materials. In a particular embodiment, the scintillation members 107 and 207 can include a laminate of alternating layers, wherein some layers are more sensitive to a particular targeted radiation, and other layers are more sensitive to a different targeted radiation. In a particular embodiment, some layers are more sensitive to gamma radiation and less sensitive to neutron radiation, whereas other layers are more sensitive to neutron radiation and less sensitive to gamma radiation. FIGS. 3 and 4 illustrate particular radiation sensors that can include a scintillating member 107 or 207.

FIG. 3 includes an illustration of a cross-sectional view of an apparatus 300 that includes a radiation sensor 310 and photosensor 340 that can be used with the radiation detection system 100 as illustrated in FIG. 1. The radiation sensor 310 can include a scintillation member 320 than includes alternating neutron sensitive layers 322 and gamma sensitive layers 324. A photosensor 340 can be coupled to the ends of the layers 322 and 324. A reflector 350 can be coupled to opposite ends of the layers 322 and 324 and along sides of the outermost gamma sensitive layers 324 of the scintillation member 320. In the illustrated embodiment, a neutron moderator 360 surrounds the scintillation member 320.

The neutron sensitive layers 322 can be configured to produce scintillating light in response to receiving neutron radiation. The scintillating light produced by the neutron sensitive layers 322 can include visible light or other radiation (such as ultraviolet radiation). In a particular embodiment, the neutron sensitive layers 322 can include a component, such as $^6$Li or $^{10}$B (in ionized or non-ionized form), to produce a secondary particle in response to absorbing a neutron. The scintillation material can also include another component, such as ZnS, CaWO$_4$, Y$_2$SiO$_5$, ZnO, ZnCdS, or another substance to produce light in response to receiving the secondary particle.

The neutron sensitive layers 322 can include scintillation material that includes a dopant that allows for or enhances the scintillation process in the material and may further cause the spectrum of the emitted light to have desirable properties such as matching the absorption spectrum of other elements in the detector. The dopant can be as a transition metal, a rare earth metal, or another element. Unless otherwise noted herein, the term "rare earth" oxide generally denotes the lanthanide series elements, as well as Y and Sc. In a particular embodiment, the neutron sensitive layers 322 can include ZnS(Ag), ZnS(Cu), ZnS(Ti); Y$_2$SiO$_5$(Ce), ZnO(Ga), ZnCdS(Cu), or CaF$_2$(Eu) where the element within the parentheses is the dopant.

The neutron sensitive layer can be within a polymer matrix. The polymer matrix can include polyvinyl toluene ("PVT"), a polystyrene ("PS"), a polymethylmethacrylate ("PMMA"), or any combination thereof. The polymer matrix can be in the form of a cast sheet, fibers, or another suitable form. When the neutron sensitive layers 322 are in the form of fibers, the fibers can have cross sections that are substantially rectangular, substantially round, or another shape.

The gamma sensitive layers 324 can be configured to produce scintillating light in response to receiving gamma radiation. The scintillating light produced by the gamma sensitive layers 324 can include visible light or other radiation (such as ultraviolet radiation). The scintillating light produced by the gamma sensitive layers 324 can be the same or different from the scintillating light produced by the neutron sensitive layers 322. In a particular embodiment, the gamma sensitive layers 324 can include a scintillation material different from the scintillation material within the neutron sensitive layers 322.

The gamma sensitive layers 324 can include an organic scintillation material. In an embodiment, the organic scintillation material can include an aromatic compound. In a particular embodiment, the aromatic compound can be a homoaromatic compound or a heteroaromatic compound. In a more particular embodiment, the aromatic compound includes a phenyl or pyrazoline aromatic compound. In another particular embodiment, the organic scintillation material can include 1,4-bis(5-phenyloxazol-2-yl)benzene, 2,5-diphenyloxazole, p-terphenyl, naphthalene, 1,4-bis[2-methylstyryl benzene] ("bis-MSB"), and 1,1,4,4-tetraphenyl-1,3 butadiene ("TPB"), another suitable organic compound, or any combination thereof. The organic scintillation material can be mixed into a solvent, such as toluene, 1-phenyl-1-xylyl ethane ("PXE"), a linear alkyl benzene ("LAB"), or another solvent. In an embodiment, the combination of the organic scintillation material and the solvent can be mixed into and dissolve within the polymer matrix.

The gamma sensitive layer 324 can include a polymer matrix can include PVT, PS, PMMA, another suitable polymer, or any copolymer thereof. The polymer matrix can be in the form of a cast sheet, fibers, or another suitable form. When the gamma sensitive layers 324 are in the form of fibers, the fibers can have cross-sections that are substantially rectangular, substantially round, or another shape. In a particular embodiment, a wavelength-shifting fiber can be used in addition to another fiber, such as a scintillation fiber, and include a plurality of materials that includes two materials having different refractive indices. For example, a wavelength shifting fiber can include a PS core clad with an acrylic material, such as PMMA. In another particular embodiment, an additional cladding may be used, such as a fluoropolymer. In another particular embodiment, the gamma sensitive layers 324 can include a cast sheet, such as a doped polymer sheet that has an absorption spectrum that substantially matches an emission spectrum of a scintillation material of the gamma sensitive layers 324.

The gamma sensitive layers 324 can include one or more fluorescent materials. In a particular embodiment, the gamma sensitive layers 324 can include p-terphenyl or bis-MSB as a fluorescent material. The fluorescent light may be green and have an emission maximum in a range of approximately 500 nm to approximately 600 nm. In a particular embodiment, the gamma sensitive layers 324 can include p-terphenyl, bis-MSB, and a benzoxanthene-dicarboxylic acid imide within a PVT matrix. Benzoxanthene-dicarboxylic acid imides are described in U.S. Pat. No. 3,741,971, and the formula below is for a particular benzoxanthene-dicarboxylic acid imide.

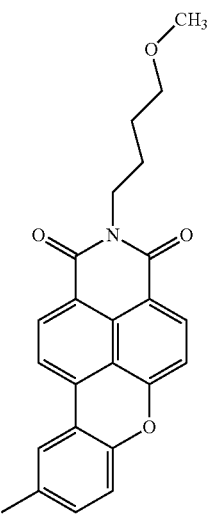 [SMILES: COCCCCn1c(=O)c2ccc3oc4ccc(C)cc4c4ccc(c1=O)c2c34]

The gamma sensitive layer 324 may include an additional fluorescent material if needed or desired. The additional fluorescent material can be tailored to shift the wavelength of scintillation light generated from neutron radiation to a different wavelength. In a particular embodiment, the fluorescent light may be green and have an emission maximum in a range of approximately 500 nm to approximately 600 nm. In a particular embodiment, the gamma sensitive layers 324 can include p-terphenyl, bis-MSB, and a benzoxanthene-dicarboxylic acid imide as a fluorescent material. Thus, in a particular embodiment, scintillating light from both gamma radiation and neutron radiation can be shifted to green light within the gamma sensitive layers 324, and therefore, the light from the fluorescent materials may have emission maxima within approximately 100 nm of each other. In a particular embodiment, the photosensor 340 can have a quantum efficiency that is relatively higher for green light than other light.

In another embodiment, the photosensor 340 may have a quantum efficiency that is relatively higher for another color of light, such as blue light. In this embodiment, the fluorescent materials can be selected such that scintillating light is shifted to blue light (emission maximum at approximately 400 nm to approximately 500 nm). After reading this specification, skilled artisans will be able to select fluorescent materials to achieve a desired range of wavelengths of light to be transmitted along the gamma sensitive layers 324.

In another embodiment, the gamma sensitive layers 324 can include an inorganic scintillation material. In a particular embodiment, the gamma sensitive layers 324 can include inorganic scintillation particles within a polymer matrix. The inorganic scintillation particles can include a sodium iodide, a calcium fluoride, a cesium iodide, a cesium lithium elpasolite, a lanthanum bromide, a lanthanum chloride, a lutetium iodide, a bismuth germanate ("BGo"), a lutetium silicate, or another suitable compound. In a particular embodiment, the inorganic scintillation particles can include NaI(Tl), $CaF_2$(Eu), PbS, $LaBr_3$(Ce), BGO, or a lutetium yttrium silicate. Any of the foregoing compounds may include a dopant, wherein the dopant is any of the rare earth elements or Tl. The polymer matrix can include the polymer matrix material as described with respect to the organic scintillation material within the gamma sensitive layers 324.

The scintillation member 320 can be made relatively large because light is readily transmitted throughout the gamma sensitive layers 324. As compared to the gamma sensitive layers 324, visible light is not as readily transmitted along the length of the neutron sensitive layers 322. A synergistic combination of the neutron and gamma sensitive layers 322 and 324 can allow scintillating light from neutron radiation generated within the neutron sensitive layers 322 to enter the gamma sensitive layers 324 and be transmitted to the photosensor 340 via the gamma sensitive layers 324. In an embodiment, the number of the gamma sensitive layers 324 is greater than the number of the neutron sensitive layers 322. In a particular embodiment, scintillation member 320 has one more of the gamma sensitive layers 324 than the neutron sensitive layers 322. In the embodiment as illustrated in FIG. 3, the scintillation member 320 has five gamma sensitive layers 324 and four neutron sensitive layers 322. More or fewer gamma sensitive layers 324 and neutron sensitive layers 322 can be used. For example, the scintillation member can include 1, 2, 3, 9, 20, or more of the neutron sensitive layers 322 or the gamma sensitive layers 324.

On a relative basis, the gamma sensitive layers 324 can be thicker than the neutron sensitive layers 322. In an embodiment, the gamma sensitive layers 324 can be at least approximately 2 times thicker than the neutron sensitive layers 322, and in another embodiment, the gamma sensitive layers 324 can be at least approximately 5 times thicker than the neutron sensitive layers 322. In a further embodiment, the gamma sensitive layers 324 can be at least approximately 25 or even 50 times thicker than the neutron sensitive layers 322. With respect to actual thicknesses, each of the gamma sensitive layers 324 can be at least approximately 1 mm thick, and in another embodiment, each of the gamma sensitive layers 324 may be no greater than approximately 60 mm thick. Each of the neutron sensitive layers 322 can be at least approximately 0.1 mm thick, and in another embodiment, each of the neutron sensitive layers 322 may be no greater than approximately 1 mm thick. In a particular embodiment, the neutron sensitive layers can have a thickness in a range of approximately 0.2 to 0.5 mm.

An optical coupling material (not illustrated) may be disposed between each immediately adjacent pair of neutron and gamma sensitive layers 322 and 324. The optical coupling material can help to improve internal reflection within the gamma sensitive layers 324. In an embodiment, the index of refraction of the optical coupling material is less than the index of refraction of the polymer matrix used in the gamma sensitive layers 324. In another embodiment, the index of refraction of the optical coupling material is less than approximately 1.49. In a particular embodiment, the optical coupling material includes a silicone rubber that has an index of refraction of approximately 1.42. In another embodiment, the index of refraction of the optical coupling material is less than approximately 1.42. In another particular embodiment, the optical coupling material includes a fluoropolymer. The optical coupling material may have a thickness no greater than approximately 0.5 mm.

When neutron radiation is received by the apparatus 300, scintillating light is generated within a neutron sensitive layer 322 and such scintillating light passes into a gamma sensitive layer 324. When the gamma sensitive layer 324 includes a wavelength shifting fluorescent material, the scintillating light is absorbed and shifted to another wavelength due to the fluorescent material within the gamma sensitive layer 324 and is transmitted as fluorescent light through the gamma sensitive layer 324 to the photosensor 340. When gamma radiation is received by the apparatus 300, scintillating light is generated within a gamma sensitive layer 324. When the gamma sensitive layer 324 includes the wavelength shifting fluorescent material, the scintillating light is shifted to another wavelength in response to the fluorescent material within the gamma sensitive layer 324 and is transmitted as fluorescent light through the gamma sensitive layer 324 to the photosensor 340.

The photosensor 340 receives the light (scintillating light, fluorescent light, or any combination thereof) and converts the light to an electronic pulse that is sent to a processing module, such as the processing module 120 in FIG. 1. The pulse analyzer within the processing module 120 can distinguish electronic pulses corresponding to neutron radiation from electronic pulses corresponding to gamma radiation based at least in part on the decay time of the light reaching the photosensor 340. In an embodiment, if the decay time is relatively long, the processing module 120 will send a signal to the radiation counter 182 that counts neutron radiation, and if the decay time is relatively short, the processing module 120 will send a signal to the radiation counter 184 that counts gamma radiation events.

In another embodiment as illustrated in FIG. 4, an apparatus 400 includes a radiation sensor 410 that is coupled to different photosensors 442 and 444. In an embodiment, the photosensor 442 can have a relatively high quantum efficiency with respect to one color of light, for example, orange light, and the photosensor 444 can have a relatively high quantum efficiency with respect to another color of light, for example, green light. In a particular embodiment, a filter may be disposed between the scintillating member 420 and either or both photosensors 442 and 444. For example, a filter between the scintillation member 420 and the photosensor 442 may filter out green light and allow orange light to pass, and a different filter between the scintillation member 420 and the photosensor 444 may filter out orange light and allow green light to pass. A neutron moderator may surround the scintillation member 420 but is not illustrated in FIG. 4.

The neutron sensitive layers 322 may have any composition and thickness as previously described. The gamma sensitive layers 424 may have any composition and thickness as previously described with respect to the gamma sensitive layers 324. As compared to gamma sensitive layers 324, the gamma sensitive layers 424 may have less or different fluorescent materials to take advantage of the different photosensors 442 and 444. For example if the scintillating light from the neutron sensitive layers 322 is orange, a fluorescent material used to convert such light to green light would not be needed. Therefore, scintillating light from the neutron sensitive layers 322 can be transmitted along the gamma sensitive layer 424 and be received by the photosensor 442. When a filter is used between the scintillation member 420 and the photosensor 444, the filter may significantly reduce or substantially prevent orange light from reaching the photosensor 444. The gamma sensitive layers 424 can include a fluorescent material that shifts scintillating light from gamma radiation to green light that can be transmitted along the gamma sensitive layers 424 and be received by the photosensor 444. When a filter is used between the scintillation member 420 and the photosensor 442, the filter may significantly reduce or substantially prevent green light from reaching the photosensor 442.

When neutron radiation is received by the apparatus 400, scintillating light is generated within a neutron sensitive layer 322 and such scintillating light passes into a gamma sensitive layer 424. When the gamma sensitive layer 424 includes a wavelength shifting fluorescent material, the scintillating light is shifted to another wavelength in response to the fluorescent material within the gamma sensitive layer 424 and is transmitted as fluorescent light through the gamma sensitive layer 424 to the photosensor 442. When gamma radiation is received by the apparatus 400, scintillating light is generated within a gamma sensitive layer 424. When the gamma sensitive layer 424 includes the wavelength shifting fluorescent material, the scintillating light is shifted to another wavelength in response to the fluorescent material within the gamma sensitive layer 424 and is transmitted as fluorescent light through the gamma sensitive layer 424 to the photosensor 444.

When neutron radiation is sensed by a neutron sensitive layer 322 in the scintillation member 420, the photosensor 442 receives the light and converts the light to an electronic pulse that is sent to a processing module, such as the processing module 220 in FIG. 2. Because the processing module 220 receives a signal from the photosensor 442, the processing module 220 can determine that neutron radiation is received by the apparatus 400 and send a signal to the radiation counter 282 that counts neutron radiation. When gamma radiation is sensed by a gamma sensitive layer 424 in the scintillation member 420, the photosensor 444 receives the light and converts the light to an electronic pulse that is sent to a processing module, such as the processing module 220 in FIG. 2. Because the processing module 220 receives a signal from the photosensor 444, the processing module 220 can determine that gamma radiation is received by the apparatus 400 and send a signal to the radiation counter 284 that counts gamma radiation.

Embodiments described herein can be used to make radiation sensors that can detect more than one targeted radiation and can be scaled to large dimensions. In a particular embodiment, the gamma sensitive layers can be relatively transparent to visible light, and therefore, the size of the gamma sensitive layers may be limited by issues not related to the transmission of light. For example, the size of the gamma sensitive layers may be limited by how large a polymer sheet or scintillation fibers may be cast or otherwise formed. The neutron sensitive layers may not have sufficient transmission over longer distances. By allowing light to enter a gamma sensitive layer from a neutron sensitive layer, such light that originated from the neutron sensitive layer can be more readily transmitted to a photosensor that is located adjacent to an end of the gamma sensitive layer. If the neutron sensitive layer cannot be manufactured as a single sheet as large as a sheet having the gamma sensitive layer, then different neutron sensitive layers can be tiled to match more closely the size of sheet having the gamma sensitive layer. Thus, a radiation sensor can be fabricated having a dimension of at least approximately 1.8 m (approximately 70 inches). The dimension can correspond to a height or a diagonal dimension of the active area of the radiation sensing portion of the radiation detection system.

A radiation detection system may be configured in different arrangements as needed or desired. For example, if the cost of or space taken up by photosensors is an issue, a single photosensor can be used in conjunction with a pulse analyzer to determine which type of radiation has been detected. One or more fluorescent materials may be included within the gamma sensitive layers so that the wavelengths of fluorescent light may be closer to the maximum quantum efficiency of the photosensor. Because the scintillating light, and fluorescent light if present, has different decay times as between neutron radiation and gamma radiation, the pulse analyzer, such as within a processing module, can monitor decay times of the light received by the photosensor to determine if gamma radiation or neutron radiation is detected.

Instead of a pulse analyzer, different photosensors responding to different wavelengths of light may be used. Thus, less complicated hardware or software may used downstream of the photosensors, such as a processing module. Referring to FIG. 4, an electronic pulse corresponding to detected neutron radiation will be output from the photosensor 442, and an electronic pulse corresponding to detected gamma radiation will be output from the photosensor 444.

In alternative embodiments, the radiation detection system may be configured to detect different targeted radiation, such as x-rays, beta particles, etc. If the two different targeted radiations produce similar electronic pulses from a single photosensor, the radiation detection system as illustrated in FIG. 4 may be useful. In a particular example, the different targeted radiation may produce scintillating light or fluorescent light having emission maxima at different wavelengths. The use of different photosensors and potentially optical filters can allow identification of a particular targeted radiation to be made more readily, and potentially more quickly.

EXAMPLE

The concepts described herein will be further described in the following example, which does not limit the scope of the invention described in the claims.

Figure 5:
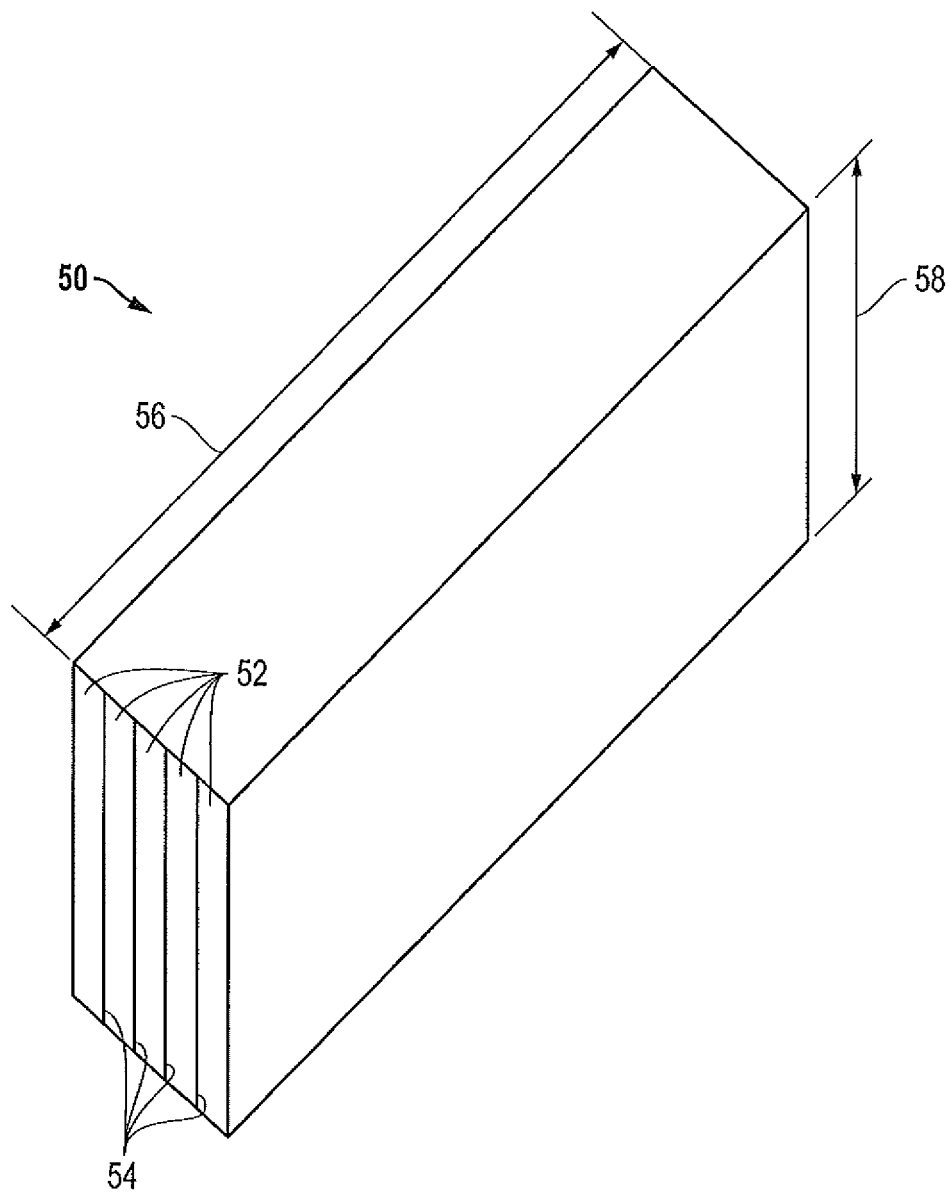
FIG. 5 includes an illustration of a perspective view of an assembly that can be used as a radiation sensor within a radiation detection system in accordance with a particular embodiment.

The example is provided to demonstrate that a radiation detection system can be used to detect gamma radiation and neutron radiation and use pulse shape analysis to distinguish between gamma radiation and neutron radiation. Referring to FIG. 5, the radiation sensor includes an assembly 50 that has four layers 54 of BC-704™ brand material, which is a neutron sensitive layer that includes $^6$Li and ZnS(Ag). Each layer 54 has a thickness in a range of 0.2 to 0.5 mm (0.01 to 0.02 inches). The assembly 50 further has five layers 52 of a gamma radiation sensitive layer that includes p-terphenyl, bis-MSB, and a benzoxanthene-dicarboxylic acid imide within a PVT matrix. Each layer 52 has a nominal thickness of 10 mm (0.4 inches). Each layer 54 is disposed between two immediately adjacent layers of layers 52, and thus, the radiation sensor has alternating layers of BC-704™ brand material and p-terphenyl, bis-MSB, and a benzoxanthene-dicarboxylic acid imide within a PVT matrix. The assembly 50 has a length (dimension 56 in FIG. 5) of 64 cm (25 inches) and a width (dimension 58 in FIG. 5) of 13 cm (5 inches). The assembly 50 is wrapped in a layer of TEFLON-brand material, which in turn is wrapped in a layer of black paper. A photodetector (not illustrated in FIG. 5) includes an ADIT™-brand photomultiplier tube (ADIT of Sweetwater, Tex., USA) having 13 cm (5 inch) nominal diameter and is grease coupled to an end of the radiation sensor. Signals from the photodetector are provided to an ORTEC®-brand Pulse Shape Sensitive Detector (Advanced Measurement Technology of Oak Ridge, Tenn., USA, not illustrated in FIG. 5) to produce spectra.

Figure 6:
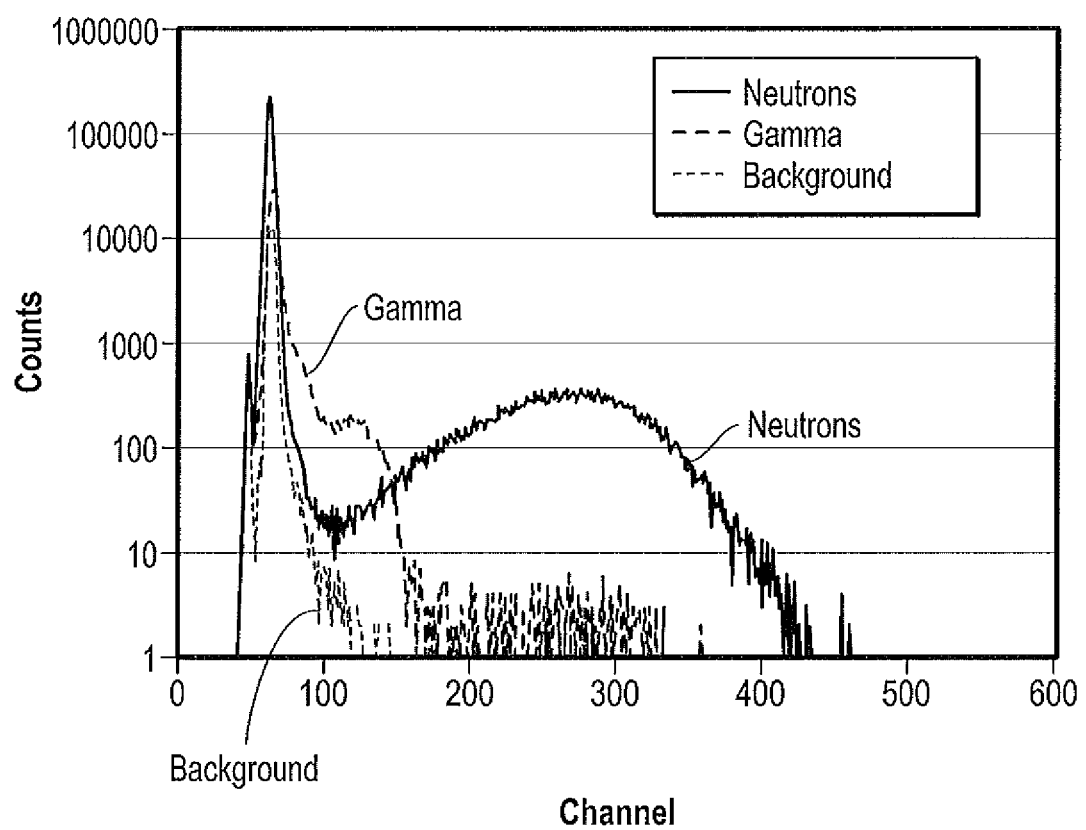
FIG. 6 includes spectra obtained using the assembly of FIG. 5.

A background spectrum (no significant gamma radiation source or neutron source near the radiation sensor) is noted as "Background" in FIG. 6. The counts to the left of channel 175 are background gamma radiation. The counting rate in this region is 276.4 counts per second (cps). Also evident between channels 175 and 400 is a small amount of background neutron radiation, approximately 0.96 cps.

A 9.67 microcurie Cs-137 (gamma radiation) source is placed approximately 15 cm from the mid point of the radiation sensor. The spectrum obtained is noted as "Gamma" in FIG. 6. The count rate in the window below channel 175 increases to 3851 cps while the count rate in the window between channels 175 and 400 remains essentially constant at 1.06 cps. The bulging on the right side of the peak is unusual and may be due to pulse pile-up. The bulge disappears when the source is moved back to 50 cm from the radiation sensor.

The Cs-137 (gamma radiation) source is removed, and an AmBe (mainly neutron) source in its moderator is positioned at approximately 200 cm from the radiation sensor. The spectrum obtained is noted as "Neutrons" in FIG. 6.

As can be clearly seen in FIG. 6, gamma radiation and neutron radiation can be readily distinguished from each other by pulse shape analysis of the spectra. The valley between the gamma and neutron peaks occurs at channel 110, but to avoid gamma spillover into the neutron window, the threshold is kept at channel 175. For this example, the count rates were 690.2 cps for the gamma window and 132.9 cps for the neutron window. Thus, the radiation detection system is sensitive to both gamma radiation and neutron radiation and provides the capability of distinguishing between gamma radiation and neutron radiation by using independent counting channels based on pulse shape. Skilled artisans know that differences in pulse shape can be determined by the decay time of the scintillation pulse and properties of the measurement electronics.

Many different aspects and embodiments are possible. Some of those aspects and embodiments are described below. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation sensor can include a first layer including a first scintillation material to produce first light in response to receiving a first targeted radiation. The radiation sensor can also include a second layer including a second scintillation material to produce second light in response to receiving a second targeted radiation, wherein the first scintillation material is different from the second scintillation material, and the first targeted radiation is different from the second targeted radiation. The first layer can be configured to receive the second light In an embodiment of the first aspect, the first layer is further configured to produce third light from the second light within the first layer. In a particular embodiment, the first layer is configured to produce fourth light from the first light. In a more particular embodiment, the first layer is configured to produce fifth light from the fourth light, wherein the third light and fifth light have emission maxima at substantially a same wavelength. In a further embodiment, the same wavelength is in a range of approximately 500 nm to approximately 600 nm. In another even more particular embodiment, the third light has an emission maximum at a third wavelength, the fourth light has an emission maximum at a fourth wavelength, and the third and fourth wavelengths are within approximately 100 nm of each other.

In a particular embodiment of the first aspect, the first layer further includes a first fluorescent material capable of producing the third light from the second light, and a second fluorescent material capable of producing the fourth light from the first light. In a more particular embodiment, the first fluorescent material includes p-terphenyl, bis-MSB, and a benzoxanthene-dicarboxylic acid imide and the second fluorescent material includes ZnS.

In still a further embodiment of the first aspect, the radiation sensor further includes another first layer, wherein the second layer is disposed between the first layers. In another embodiment, the radiation sensor further includes other first layers and at least one additional second layer, wherein the radiation sensor includes a laminate composite of alternating first and second layers. In still another embodiment, the first layer is in a form of fibers. In a particular embodiment, the first layer further includes a polymer matrix, wherein the first scintillation material is within the polymer matrix. In a further embodiment, the radiation sensor further includes an optical coupling material between the first and second layers, wherein an index of refraction of the optical coupling material is less than an index of refraction of the first layer. In a particular embodiment, the index of refraction of the optical coupling material is no greater than approximately 1.49. In a more particular embodiment, the first layer further includes a polyvinyl toluene, a polystyrene, a polymethylmethacrylate, or any combination thereof, and the optical coupling material includes a silicon rubber or a fluoropolymer.

In another embodiment of the first aspect, the first layer is thicker than the second layer. In a particular embodiment, the first layer is at least approximately 2 times thicker than the second layer. In another particular embodiment, the first layer is at least approximately 5 times thicker than the second layer. In still another particular embodiment, the first layer is at least approximately 25 or even 50 times thicker than the second layer. In yet another embodiment, the first layer is more sensitive to gamma radiation than to neutron radiation, and the second layer is more sensitive to neutron radiation than to gamma radiation.

In a further embodiment of the first aspect, the second scintillation material includes a first compound to produce a secondary particle in response to receiving the neutron, and a second compound to produce the second light in response to receiving the secondary particle. In a particular embodiment, the first compound includes $^{6}$Li or $^{10}$B. In a more particular embodiment, the second compound includes ZITS, $CaWO_4$, $Y_2SiO_5$, ZnO, $CaF_2$, or ZnCdS. In still another particular embodiment, the first scintillation material includes an organic material. In a more particular embodiment, the organic material includes 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene. In yet another particular embodiment, the first scintillation material includes an inorganic material. In a more particular embodiment, the inorganic material includes a sodium iodide, a calcium fluoride, a cesium iodide, a cesium lithium elpasolite, a lanthanum bromide, a lanthanum chloride, a lutetium iodide, a bismuth germanate, or a lutetium silicate.

In a second aspect, a radiation detection system can include a radiation sensor and a first photosensor. The radiation sensor can include a first layer including a first scintillation material to produce first light in response to receiving a first targeted radiation. The radiation sensor can further include a second layer including a second scintillation material to produce second light in response to receiving a second targeted radiation, wherein the first scintillation material is different from the second scintillation material, and the first targeted radiation is different from the second targeted radiation. The first layer can be configured to receive and transmit the second light. The first photosensor can be coupled to the first layer.

In an embodiment of the second aspect, the first layer is configured to receive the second light. In a particular embodiment, the first layer is further configured to produce third light from the second light within the first layer. In a more particular embodiment, the first layer is configured to produce fourth light from the first light. In an even more particular embodiment, the first layer is configured to produce fifth light from the fourth light, wherein the third light and fifth light have emission maxima at substantially a same wavelength. In a further embodiment, the same wavelength is in a range of approximately 500 nm to 600 nm. In another even more particular embodiment, the third light has an emission maximum at a third wavelength, the fourth light has an emission maximum at a fourth wavelength, and the third and fourth wavelengths are within approximately 100 nm of each other.

In yet another embodiment of the second aspect, the first layer further includes a first fluorescent material capable of producing the third light from the second light, and a second fluorescent material capable of producing the fourth light from the first light. In a particular embodiment, the first fluorescent material includes p-terphenyl, bis-MSB, and a benzoxanthene-dicarboxylic acid imide, and the second fluorescent material includes ZnS.

In a further embodiment of the second aspect, the first layer is more sensitive to gamma radiation than to neutron radiation, and the second layer is more sensitive to neutron radiation than to gamma radiation. In still a further embodiment, the radiation detection system further includes a second photosensor coupled to the first layer, wherein the second photosensor is different from the first photosensor. In a particular embodiment, the first photosensor is coupled to a first end of the first layer, and the second photosensor is coupled to the first layer at a second end opposite the first end. In yet another embodiment, the first photosensor is an only photosensor coupled to the first layer. In a particular embodiment, the radiation detection system further includes a pulse analyzer coupled to the first photosensor. In another particular embodiment, the radiation detection system further includes a reflector, wherein the first photosensor is coupled to a first end of the first layer, and the reflector is coupled to the first layer at a second end opposite the first end.

In another embodiment of the second aspect, the radiation detection system further includes a neutron moderator to convert a fast neutron to a thermal neutron. In still another embodiment, the radiation sensor includes additional first and second layers, wherein the radiation sensor is configured to include a laminate, wherein the first and second layers alternate with each other. In a particular embodiment, each of the first layers is at least approximately 2 mm thick. In another particular embodiment, each of the first layers is no greater than approximately 60 mm thick. In still another particular embodiment, each of the second layers is at least approximately 0.1 mm thick. In yet another particular embodiment, each of the second layers is no greater than approximately 1.0 mm thick. In a further particular embodiment, each of the first layers has a thickness in a range of approximately 5 mm to approximately 15 mm, and each of the second layers has a thickness in a range of approximately 0.1 mm to approximately 1.0 mm. In still a further particular embodiment, the radiation sensor has n+1 first layers and n second layers, wherein n is at least 1. In a more particular embodiment, the radiation sensor has 5 first layers and 4 second layers and having an alternating first layer-second layer configuration. In another embodiment, the radiation sensor comprises a plurality of discrete units, wherein each discrete unit includes a second layer between two first layers. In yet a further particular embodiment, the radiation detection system further includes an optical coupling material, wherein the optical coupling material is disposed between each pair of immediately adjacent first and second layers.

In a third aspect, a method of detecting radiation can include providing a radiation sensor of a radiation detection system in an environment, wherein the radiation sensor includes a first radiation sensitive layer and a second radiation sensitive layer, and the first radiation sensitive layer is adapted to transmit scintillation light received from the second radiation sensitive layer. The method can further include determining whether the environment contained a significant amount of the first radiation, the second radiation, or both the first and second radiation.

In an embodiment of the third aspect, the method further includes generating a spectrum based on data collected when the radiation sensor is in the environment. In a particular embodiment, determining whether the environment contained a significant amount of the first radiation, the second radiation, or both the first and second radiation comprises performing pulse shape analysis on the spectrum. In another embodiment, the radiation sensor has n+1 first radiation sensitive layers and n second radiation sensitive layers, wherein n is at least 1, in an alternating first radiation sensitive layer-second radiation sensitive layer configuration. In still another embodiment, the radiation sensor comprises a plurality of discrete units, wherein each discrete unit includes a second radiation sensitive layer disposed between two first radiation sensitive layers. In yet another embodiment, the first radiation includes gamma radiation, and the second radiation includes neutron radiation.

In a further embodiment of the third aspect, the first radiation sensitive layer has a first pulse time when exposed to first radiation, the second radiation sensitive layer has a second pulse time when exposed to second radiation, and the second pulse time is at least two times longer than the first pulse time. In a particular embodiment, the second pulse time is at least three, five, or ten times longer than the first pulse time.

Note that not all of the activities described above in the general description or the examples are required, that a portion of a specific activity may not be required, and that one or more further activities may be performed in addition to those described. Still further, the order in which activities are listed is not necessarily the order in which they are performed.

In a particular embodiment, a method may be described in a series of sequential actions. The sequence of the actions and the party performing the actions may be changed without necessarily departing from the scope of the teachings unless explicitly stated to the contrary. Actions may be added, deleted, or altered. Also, a particular action may be iterated. Further, actions within a method that are disclosed as being performed in parallel may in particular cases be performed serially, and other actions within a method that are disclosed as being performed serially may in particular cases be performed in parallel.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation sensor comprising:
a first layer including a polymer matrix including a first scintillation material within the polymer matrix to produce first light in response to receiving a first targeted radiation, wherein the polymer matrix further includes a wavelength shifting material; and
a second layer including a second scintillation material to produce second light in response to receiving a second targeted radiation, wherein the first scintillation material is different from the second scintillation material, and the first targeted radiation is different from the second targeted radiation,
wherein the first layer is configured to receive and transmit the second light.

2. The radiation sensor of claim 1, wherein the first layer is thicker than the second layer.

3. The radiation sensor of claim 1, wherein:
the first layer is more sensitive to gamma radiation than to neutron radiation; and
the second layer is more sensitive to neutron radiation than to gamma radiation.

4. The radiation sensor of claim 1, wherein the second scintillation material comprises:
a first compound to produce a secondary particle in response to receiving the neutron; and
a second compound to produce the second light in response to receiving the secondary particle.

5. The radiation sensor of claim 4, wherein the first compound comprises $^6$Li or $^{10}$B.

6. The radiation sensor of claim 4, wherein the second compound includes ZnS, CaWO$_4$, Y$_2$SiO$_5$, ZnO, CaF$_2$, or ZnCdS.

7. The radiation sensor of claim 4, wherein the first scintillation material comprises an organic material.

8. The radiation sensor of claim 7, wherein the organic material comprises 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene.

9. The radiation sensor of claim 4, wherein the first scintillation material comprises an inorganic material.

10. The radiation sensor of claim 9, wherein the inorganic material comprises a sodium iodide, a calcium fluoride, a cesium iodide, a cesium lithium elpasolite, a lanthanum bromide, a lanthanum chloride, a lutetium iodide, a bismuth germanate, or a lutetium silicate.

11. A radiation detection system comprising:
a radiation sensor including a laminate composite comprising:
n+1 first layers each including a polymer matrix including a first scintillation material within the polymer matrix to produce first light in response to receiving a first targeted radiation and a wavelength shifting material; and
n second layers each including a second scintillation material to produce second light in response to receiving a second targeted radiation, wherein the first scintillation material is different from the second scintillation material, and the first targeted radiation is different from the second targeted radiation,
wherein n is at least 1; the first and second layers alternate with each other; and the first layers are configured to receive and transmit the second light; and
a photosensor coupled to the first layers,
wherein the radiation detection system includes one photosensor.

12. The radiation detection system of claim 11, wherein:
each of the first layers is further configured to produce third light from the second light within the first layer;
each of the first layers is configured to produce fourth light from the first light; and
each of the first layers is configured to produce fifth light from the fourth light, wherein the third light and fifth light have emission maxima at substantially a same wavelength.

13. The radiation detection system of claim 12, wherein the same wavelength is in a range of approximately 500 nm to approximately 600 nm.

14. The radiation detection system of claim 12, wherein the wavelength shifting material comprises:
a first fluorescent material capable of producing the third light from the second light; and
a second fluorescent material capable of producing the fourth light from the first light.

15. The radiation detection system of claim 14, wherein the first fluorescent material includes p-terphenyl, bis-MSB, and a benzoxanthene-dicarboxylic acid imide.

16. The radiation detection system of claim 14, wherein the second fluorescent material includes ZnS.

17. The radiation detection system of claim 11, wherein:
each of the first layers is more sensitive to gamma radiation than to neutron radiation; and
each of the second layers is more sensitive to neutron radiation than to gamma radiation.

18. The radiation detection system of claim 11, further comprising a second photosensor coupled to the first layers, wherein the second photosensor is different from the first photosensor.

19. A method of detecting radiation comprising:
providing a radiation sensor of a radiation detection system in an environment, wherein the radiation sensor includes a laminate composite comprising alternating first radiation sensitive layers each including a polymer matrix including a wavelength shifting material and second radiation sensitive layers, and the first radiation sensitive layers are adapted to transmit scintillation light received from the second radiation sensitive layers and coupled to a photosensor, wherein the radiation detection system includes one photosensor;
determining whether the environment contained a significant amount of the first radiation, the second radiation, or both the first and second radiation.

20. The method of claim 19, further comprising generating a spectrum based on data collected when the radiation sensor is in the environment, wherein determining whether the environment contained a significant amount of the first radiation, the second radiation, or both the first and second radiation comprises performing pulse shape analysis on the spectrum.

* * * * *